United States Patent [19]
Wang et al.

[11] Patent Number: 5,600,777
[45] Date of Patent: *Feb. 4, 1997

[54] METHOD AND SYSTEM FOR SPATIAL ACCESSING OF TIME-BASED INFORMATION

[75] Inventors: Weijia Wang, Sunnyvale; Sean M. White, San Francisco, both of Calif.

[73] Assignee: Interval Research Corporation, Palo Alto, Calif.

[ * ] Notice: The term of this patent shall not extend beyond the expiration date of Pat. No. 5,461,711.

[21] Appl. No.: 509,165

[22] Filed: Jul. 31, 1995

Related U.S. Application Data

[63] Continuation of Ser. No. 172,637, Dec. 22, 1993, Pat. No. 5,461,711.
[51] Int. Cl.⁶ ..................................................... G06F 3/02
[52] U.S. Cl. .......................... 395/326; 395/806; 345/173; 345/156; 340/407.2
[58] Field of Search ..................... 395/155, 154, 395/161, 160, 159; 345/173, 156, 179, 184; 340/407.1, 407.2, 825.19

[56] References Cited

U.S. PATENT DOCUMENTS

| | | | |
|---|---|---|---|
| 4,752,836 | 6/1988 | Blanton et al. | 395/152 X |
| 4,757,302 | 7/1988 | Hatakeyama et al. | 340/407.2 |
| 4,943,866 | 7/1990 | Barker et al. | 395/155 X |
| 4,964,004 | 10/1990 | Barker | 345/156 X |
| 5,109,482 | 4/1992 | Bohrman | 395/154 |
| 5,191,320 | 3/1993 | MacKay | 345/184 |
| 5,191,645 | 3/1993 | Carlucci et al. | 395/159 |
| 5,202,961 | 4/1993 | Mills et al. | 395/159 |
| 5,381,158 | 1/1995 | Takahara et al. | 345/156 |
| 5,388,197 | 2/1995 | Rayner | 395/154 |
| 5,404,444 | 4/1995 | Billings | 395/161 |

*Primary Examiner*—Raymond J. Bayerl
*Attorney, Agent, or Firm*—Brooks & Kushman

[57] ABSTRACT

A method and system for permitting a user to spatially access and playback time-based information having a plurality of segments. Each of the plurality of segments are mapped to a corresponding one of a plurality of mapped spatial coordinates. A user interface determines an input spatial coordinate corresponding to a portion of a user's body within an input coordinate space. A segment of the time-based information corresponding to the input spatial coordinate is accessed and played back using a playback device. A sensory output which corresponds to the segment is produced for sensing by the portion of the user's body. The sensory output aids the user in obtaining a sense of the whole of the time-based information in the input coordinate space.

15 Claims, 7 Drawing Sheets

1

METHOD AND SYSTEM FOR SPATIAL ACCESSING OF TIME-BASED INFORMATION

This is a continuation of application Ser. No. 08/172,637 filed on Dec. 22, 1993, now U.S. Pat. No. 5,461,711.

TECHNICAL FIELD

The present invention relates to a method and system for accessing time-based information based on spatial coordinate information obtained from a user.

BACKGROUND ART

Absorbing and processing time-based information is more difficult than absorbing spatially distributed information. This is, in part, due to the difficulty in creating a "sense of the whole" from time-based information. For instance, it is a common experience that visual reading of printed text is much easier and faster than listening to recorded speech. The focus of the eye (fovea vision) can move quickly from one place to another; the peripheral vision fuzzily views a large area around the fovea so a reader knows where the fovea vision is with respect to the rest of the printed text (e.g., the rest of page, the rest of the sentence, the rest of the word) at any given moment. It is the peripheral vision that enables the fovea vision to locate quickly the places the reader wants to examine. Therefore, visual reading can be thought of as "instant arbitrary accessing".

In contrast the conventional devices which people use to access time-based information, for instance, an audio and/or video player, only display such information sequentially (e.g., playing back recorded audio or video frames). In other words, the conventional devices present time-based information only along a time axis. Since time is sequential, at any moment, the person who is accessing such information is exposed to only a small segment of the information. Given that a human's temporal memory is short and has poor resolution of time, it is difficult for users to determine the relative timing mark of a particular information segment with respect to the entire piece of information being displayed or accessed.

Even if the underlying devices allow users to quickly move from one part of the speech to another (e.g., a digital storing device that allows random access), a listener normally would not do so, simply because he/she doesn't know where he/she is with respect to the entire information at any moment, thus he/she doesn't know where to move. Thus the difficulty of accessing time-based information stems chiefly from the lack of the capability to generate a sense of the whole due to the combination of characteristics of human sight, hearing, memory, and the way conventional devices work. This temporal limitation makes it much more difficult to construct a general outlook of the set of information.

If time-based information, such as recorded speech, could be translated precisely into printed text or some other spatial visual codes such as pictures, accessing the time-based information could be turned into reading. However, automatic speech recognition is far from perfect. Thus alternative ways to absorb and present recorded speech are needed.

Many prior art systems have attempted to solve this problem. Most of the previous research has emphasized one of the following approaches:

1. Condensing the information by extracting important (situation dependent) portions or by throwing out insignificant portions. This approach is not effective in all circumstances since it assumes that some of the time-based information, is in fact, insignificant and that an efficient method exists for prioritizing the information.

2. Utilizing the characteristics of the information, such as the amplitude of the waveform of a recorded speech, and structural patterns to visually annotate the information so that different segments can be easily distinguished. Thus this approach relies upon an effective automatic feature extraction system. This approach is also difficult to implement and not effective for all sources of time-based information.

Other prior art systems have addressed the presentation of recorded speech based upon the prior knowledge of the structure of the underlying text. An example of one such system is the multimedia package "From Alice to Ocean" marketed by Apple Computers. This package presents the story of a woman's journey across the Australian desert. The text of the story, as read by the author, has been stored in convenient segments. These segments of text are accessed by a user along with corresponding visual images based upon visual cues displayed on a computer screen.

A second prior art system of this kind is a CD-ROM game/reader, "Just Grandma and Me," marketed by Broderbund. This package allows a user to play back prerecorded spoken words corresponding to the words of a story displayed on a computer screen.

These systems and their underlying methods do not address the problem of accessing time-based information without the additional a priori information provided by the presence of the text. If the underlying text is known, the solution to the problem is trivialized since the text itself could be used to directly access the information, e.g. directly reading or text-to-speech translation. This is not an effective approach for time-based information which lacks a priori access to a textual interpretation or other similar script.

SUMMARY OF THE INVENTION

It is thus an object of the present invention to provide a method and system for permitting a user to spatially access and play back time-based information.

It is also an object of the present invention to create a sense of the whole for accessing time-based information which is analogous to what peripheral vision creates in reading printed text.

It is thus a further object of the present invention to provide a method and system for accessing time-based information by converting it to spatially distributed information so that the information can be easily accessed and browsed.

It is thus an additional object of the present invention to provide a method and system for converting or mapping time-based information to spatially distributed information.

Moreover, an object of the present invention is to provide a method and system for accessing the spatialized information in a way that is relevant to the time-based origins of the information.

An additional object of the present invention is to provide a method and system which allow a user to utilize kinesthetic and tactile memories to memorize the locations of segments of the spatialized information and obtain a sense of the whole such that the user can achieve an apparent parallel and arbitrary access of the information which resembles visual reading.

A further object of the present invention is to provide a method and system of using physical inputs from a user which include any human body movement (e.g., fingers, tongue, head, shoulder, knees, toe, etc.) to scan a spatialized representation of time-based information.

A more specific object of the present invention is to provide a method and system for permitting a user to spatially access and play back time-based information, by physical inputs, in such a manner that the human spatial memory of the user can be relied upon to re-access information previously accessed. In this manner, the information can be skimmed by the user to determine portions of the information which warrant a more careful scanning.

In carrying out the above objects, the present invention provides a method of permitting a user to spatially access and playback time-based information having a plurality of segments. The method includes mapping each of the plurality of segments to a corresponding one of a plurality of mapped spatial coordinates. A user interface is provided to define an input coordinate space. Using the user interface, an input spatial coordinate of a portion of a user's body within the input coordinate space is determined. A segment of the time-based information corresponding to the input spatial coordinate is then accessed, and played back in its original form. A sensory output which corresponds to the segment is produced for sensing by the portion of the user's body. The sensory output aids the user in obtaining a sense of the whole of the time-based information in the input coordinate space.

Further in carrying out the above objects, the present invention provides a system for implementing the above-described method.

The objects, features and advantages of the present invention are readily apparent from the following detailed description of the best mode for carrying out the invention when taken in connection with the accompanying drawings.

While the invention will be described in connection with the several embodiments, it will be understood that this description is not intended to limit the invention to these embodiments. On the contrary, the invention is intended to cover all alternatives, modifications and equivalents as may be included within the spirit and scope of the invention as defined by the appended claims.

BEST MODE FOR CARRYING OUT THE INVENTION

The present invention solves the problems presented by the prior art in accessing time-based information by mapping and transforming the timing of time-based information segments to spatial coordinates. Such spatial coordinates could be any Cartesian or non-Cartesian coordinates in one, two, or three dimensional Euclidean or non-Euclidean space. With this mapping, segments of time-based information can be associated with different parts of a spatial object, a spatial representation, or a different position of a spatial movement.

It should be understood that the term, "time-based information," as used herein should be interpreted broadly to include, but not be limited to, any general signal or collection of data which can be expressed in temporal form. Examples include audio signals, whether analog or digital, such as speech, music, and MIDI signals; visual information, such as video, animation and other graphical information; and other temporal data such as electromagnetic signals, stock closing information, daily temperature data, etc.

Figure 1:
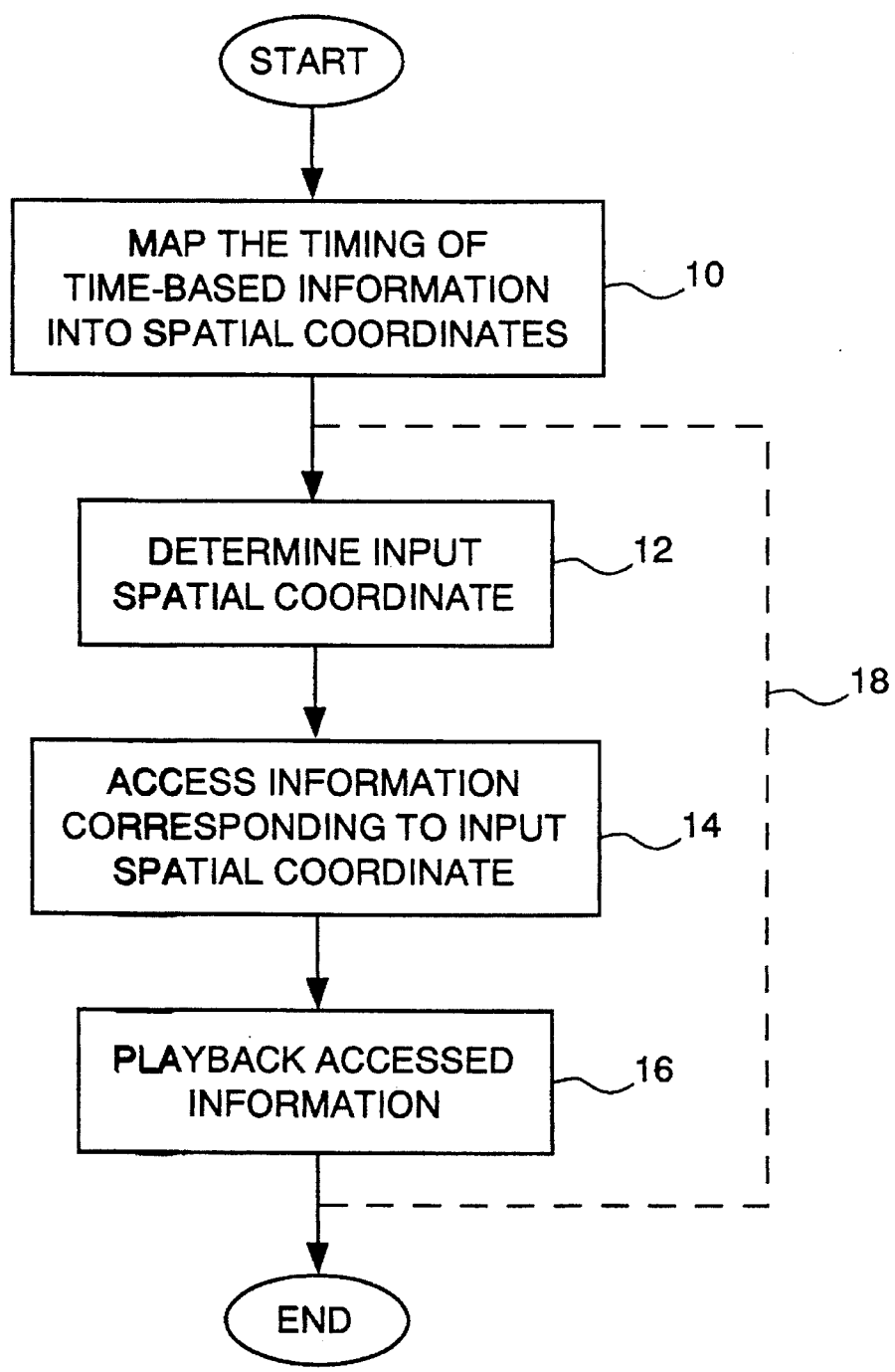
FIG. 1 is a flow-chart representation of one embodiment of the method of the present invention.

Turning now to FIG. 1, a flow-chart representation of one embodiment of the present invention is presented. The timing of time-based information, such as audio, video, or any other time-based signal, is mapped to a set of spatial coordinates as shown in step 10. Various methods are possible for mapping the timing of time-based information to spatial coordinates. These include, but are not limited to: mapping continuous timing marks of time-based information to spatial coordinates, mapping sequential numbers of words (in a piece of speech) to spatial coordinates, and mapping other structural formations found in time-based information to spatial representations.

These spatial coordinates may have any number of degrees of freedom. Thus, the transformation of the present invention may map the time-based information into three coordinates in a three-dimensional space, map the time-based information into three coordinates of position and three coordinates of orientation of a geometric solid in three-dimensional space, or map the time-based information into a set of positions and orientations for a series of connected joints in a three-dimensional space.

An input spatial coordinate is then determined based upon a physical input from the user generated by the movement of the user's body as shown in step 12. This step could be performed by sensing the position, velocity, acceleration and/or orientation of one or more portions or joints of the user's body. Examples include but are not limited to utilizing multiple finger positions on a position-digitizer pad that can convert fingers' position on the pad to a set of spatial coordinates, positions generated by a hand controller or tongue-controlled positioning device, or positions generated by an interface device which responds to head movement. Interface devices of this sort are commonly used in virtual reality applications.

The determined input spatial coordinate must be in the same coordinate space as the mapped spatial coordinates of the time-based information. Thus, each segment of time-based information would correspond to a possible input spatial coordinate.

A segment of the time-based information whose mapped spatial coordinate corresponds to the input spatial coordinate is then accessed as shown in step 14, and the accessed first segment of time-based information is then played back to the user as shown in step 16. At this point the method may end, or optionally, may continue by determining a new input spatial coordinate accessing further information corresponding to the new input spatial coordinate and playing back this new accessed information as shown by path 18 and steps 12, 14, and 16. By this means, after the portion of the user's body has been moved to a subsequent position, human spatial memory can be used to return the user's body to the first position to re-access and play back the segment of time-based information. This human spatial memory could be kinesthetic memory, the memory that memorizes spatial positions of human physical movement through sensing muscle tension. The term "Human Spatial Memory" should be broadly constituted to also cover other spatial memories of the user such as touching memory of the user, the memory that memorizes spatial locations on a portion of a human body (e.g., a palm) where skin is stimulated by touching.

In this fashion, the sense of the whole capability of peripheral vision provided in visual reading by human memories can be emulated by spatial movement and positioning of the user's body. This emulation may occur by utilizing a finger's kinesthetic memory, a palm's tactile and touching memory, a tongue's kinesthetic memory, or other types of human spatial memory based upon the choice of interface device and based upon the choice of possible input spatial coordinates.

Figure 2:
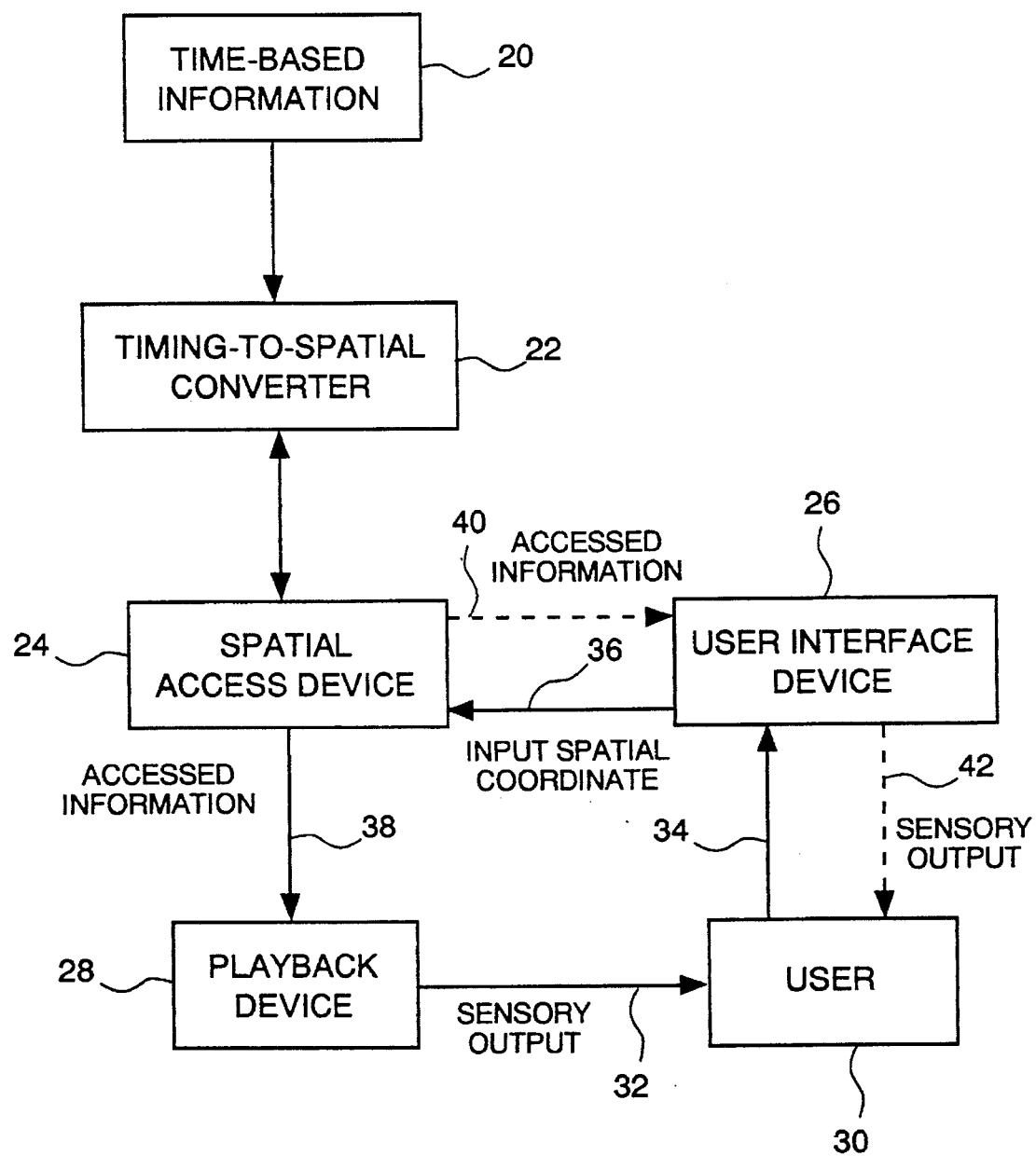
FIG. 2 is a block-diagram representation of one embodiment of the system of the present invention.

FIG. 2 presents a block-diagram representation of one embodiment of the system of the present invention. The timing of time-based information 20, having a plurality of segments, is mapped to a set of spatial coordinates by timing-to-spatial converter 22. This converter could be implemented by a programmable logic array or discrete logic device, or by an analog computational device. However, in the preferred embodiment, this timing-to-spatial conversion is performed by software or firmware running on a central processing unit of a computer, such as a microprocessor.

User interface device 26 determines an input spatial coordinate corresponding to a physical input generated by the user 30. Arrow 34 represents the physical input from user 30 to user interface device 26. User interface device 26 is also capable of providing a sensory output or feedback 42 to user 30. This sensory output may take the form of some vibration, touch, temperature, or other sensory information which corresponds to the accessed time-based information and which aids the user in obtaining a sense of the whole of the time-based information in input coordinate space.

User interface device 26 in turn provides the determined input spatial coordinate 36 to spatial access device 24. This spatial access device accesses a segment of time-based information whose mapped spatial coordinate corresponds to the input spatial coordinate. This accessed information 38 is transferred from spatial-access device 24 to playback device 28 in order to provide a sensory output 32 to user 30. Sensory output 32 of playback device 28 is provided in a manner which emulates the form of the original form of the time-based information. Thus, if the original information is audio, the playback device plays back this audio information to the user as sound. Further, if the time-based information is graphical information such as video or animation, then the playback device plays back the time-based information to the user in the form of graphical images. These sensory outputs 32 of playback device 28 should be contrasted with the sensory output 42 of user interface device 26, whose purpose is to aid users in accessing the information. The sensory output 42 would generally be in a form which differs from the original form of the time-based information. Examples of such sensory output include vibration and other tactile output as well as supplementary audio and visual cues which do not emulate the time-based information.

Figure 3:
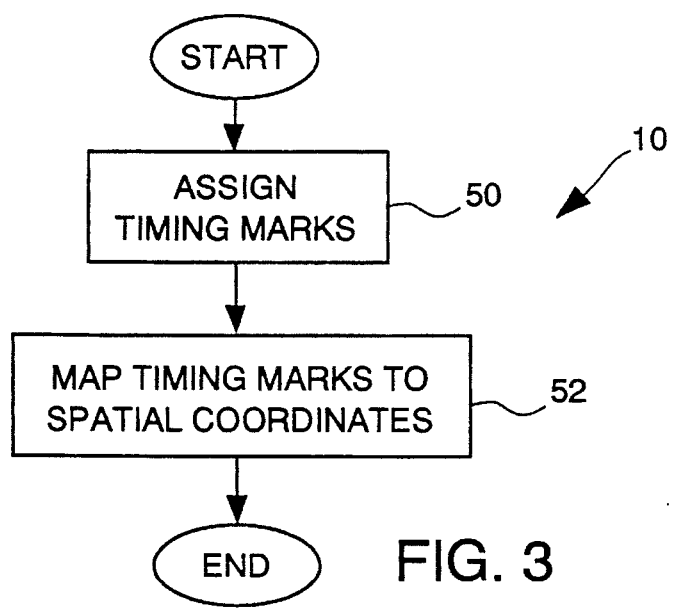
FIG. 3 is a flow-chart representation of the method of transforming time-based information into spatial-based information of one embodiment of the present invention.

Turning now to FIG. 3, one method is presented for performing the step of mapping the timing of the time-based information into a set of spatial coordinates, as shown in step 10 of FIG. 1. The time based information is assigned a series of sequential timing marks as shown in step 50. These timing marks could be equally spaced in time, or unequally spaced. If the timing marks were unequally spaced, they could be arranged based upon the structural attributes of the information. For example, in the case of speech, the timing marks could be used to set boundaries between syllables, words, sentences, paragraphs, or pages of spoken words thereby forming segments of time-based information. These timing marks are then each mapped into a corresponding one of a plurality of mapped spatial coordinates which in turn correspond to the set of possible input spatial coordinates as shown in step 52.

The segments of the time-based information which are accessed may correspond to the time-based information between two successive timing marks. In this case, the segments are non-overlapping. This need not be the case for all applications. For instance, a segment corresponding to a given timing mark may be the time based information from the preceding timing mark to the subsequent timing mark. Further, filtering or windowing may be used to allow a segment to fade in at the beginning and/or fade out at the end.

Figure 4:
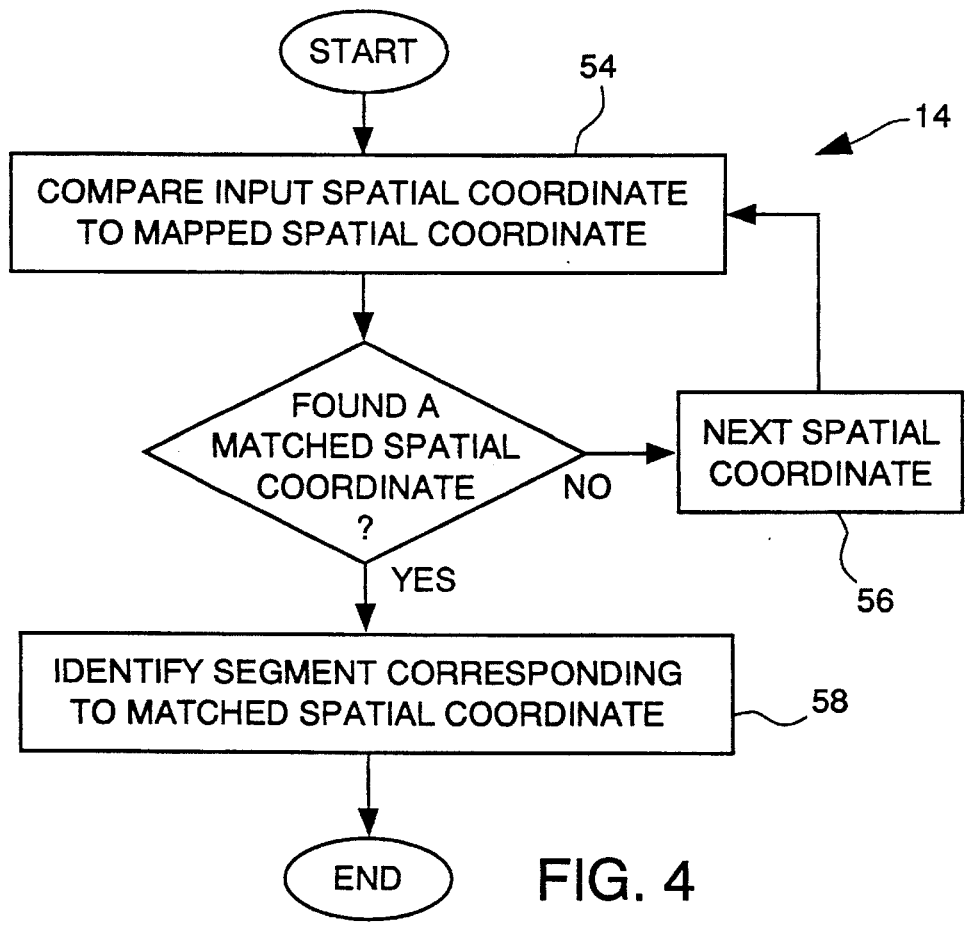
FIG. 4 is a flow-chart representation of a method for accessing time-based information corresponding to an input spatial coordinate of one embodiment of the present invention.

Turning now to FIG. 4, a flow-chart representation of one embodiment of step 14, accessing information corresponding to an input spatial coordinate, as shown in FIG. 1, is presented. The input spatial coordinate is compared to a mapped spatial coordinate as shown in step 54. If the input spatial coordinate matches the mapped spatial coordinate, then a segment of the time-based information is identified which corresponds to the matched storage spatial coordinate as shown in step 58. If the input spatial coordinate does not match the mapped spatial coordinate, then a next-mapped spatial coordinate is chosen for the comparison as shown in step 56, and step 54 is repeated until a match is found.

To summarize, the three major principles behind this invention are: (i) mapping the timing of time-based information to a set of spatial coordinates; (ii) utilizing kinesthetic and touching memory to help construct a sense of the whole for accessing the information; and (iii) using various modes of interaction to aid users in moving around in the information and controlling the transformation. A general procedure for constructing an embodiment of the present invention is given as follows:

(1) Choose the form of physical movement and physical input to signify an input spatial coordinate. In particular, any moveable portion of the human body can be used to generate a physical input.

(2) Decide what patterns of movement to use.

(3) Choose a mapping from the timing marks of the time-based information to the spatial coordinates that the moving pattern traverses. At this stage, physical (e.g., electronically) devices are involved to sense the spatial movement and display the sound according to a given time-space mapping.

Figure 5:
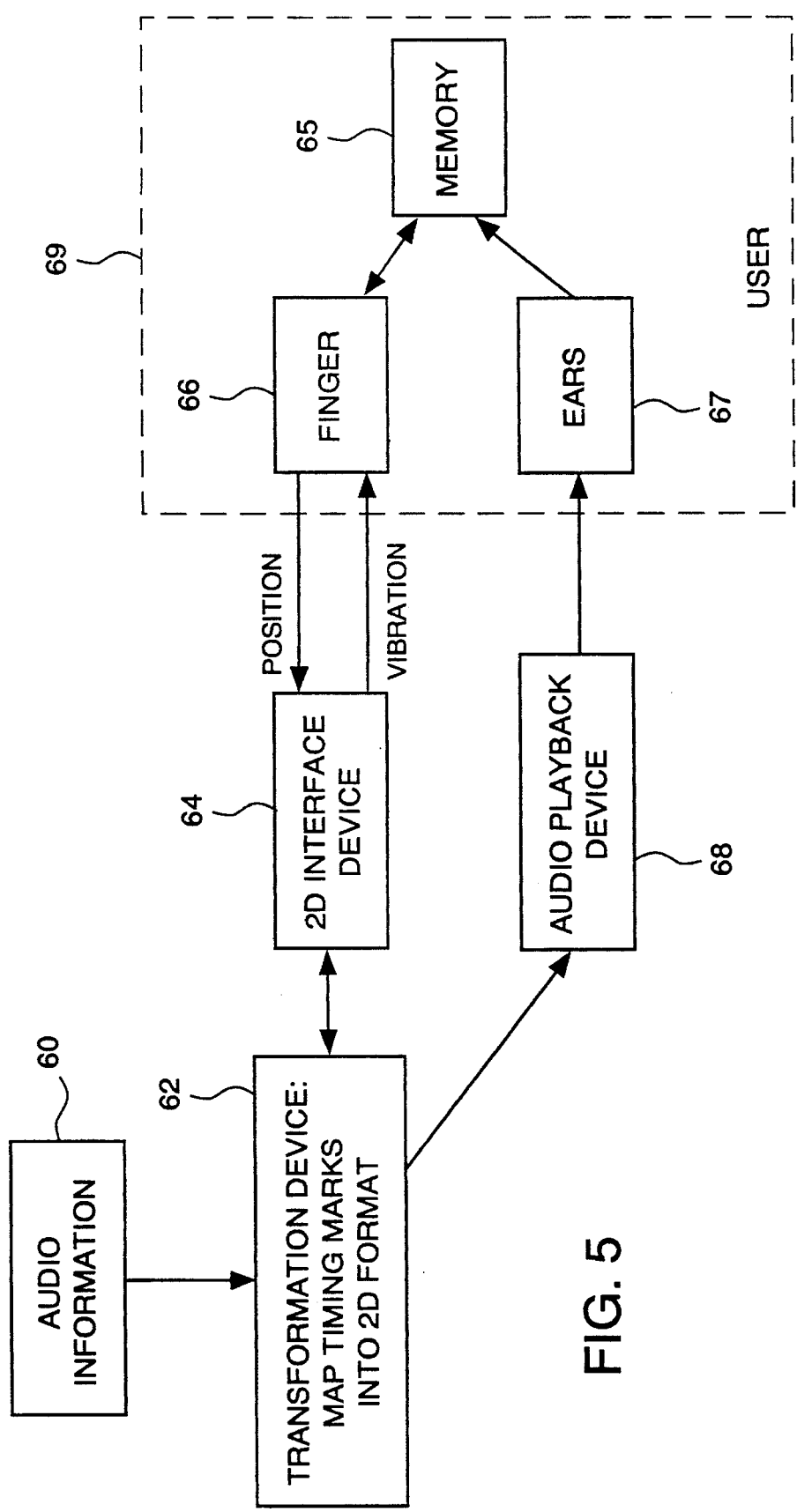
FIG. 5 is a block-diagram representation of an alternative embodiment of the system of the present invention.

Turning now to FIG. 5, a block diagram representation of an alternative embodiment of the system of the present invention is presented. Given that the ear is the second best information-absorbing sensory organ (next to the eyes), in this embodiment of the present invention, we consider using the ears to listen to sound (as opposed to converting sound into the media perceived by other sensory modality, e.g., tactile). To move from one part of spatially distributed sound to another, one can use any portion of the human body that can move spatially. One of the most convenient portions of the body is the hand, i.e., palm and fingers. Fingers can move quickly enough to match the speed with which the ears can listen. In this embodiment of the present invention, the kinesthetic and touching memories associated with one or more fingers, coupled with listening, are used to create a sense of the whole, similar to an "overview" capability in reading.

This embodiment of the present invention uses a touch sensitive pad to provide input spatial coordinates in a two-dimensional space. The timing of time-based information is converted to two-dimensional spatialized data which is then browsed and accessed with fingers. Timing marks are mapped onto a page format, i.e., sound are distributed on the surface in rows like printed text. The fingers provide a source of kinesthetic and tactile memory which allow the user to create a representation of the information.

More particularly, the timing of audio information 60 is transformed into a two-dimensional spatial format by transformation device 62. This transformation device creates a series of timing marks in the audio information and maps these timing marks into a set of two-dimensional coordinates. A user 69 accesses this audio information by means of finger 66. The device that senses finger position and movement is two-dimensional interface device 64, a touch-sensitive pad which generates a two-dimensional coordinate of the position where the hand is touching the surface. These coordinates are transferred from interface device 64 to transformation device 62 to determine the audio information which corresponds to these two-dimensional coordinates. This audio information is in turn transferred back to interface device 64, which provides a vibration feedback to finger 66. This vibration feedback is implemented by providing a vibratory output by means of an activator or speaker (not shown) attached to the interface device 64. The vibration output is in proportion to an audio signal created from the accessed audio information. The accessed audio information is further provided to audio playback device 68, which plays back the accessed audio information to the ears 67 of user 69. The memory 65 of user 64 guided by touch and memorized position of the user's finger in "the whole" allows the user to re-access a previously accessed portion of audio signal.

Note that there are many spatial distribution patterns of the sound on such a surface. Examples include:

(i) Playing back only the segment which is corresponding to the spatial location the finger is pointing to;

(ii) Playing back a certain length of sound starting from a segment which corresponds to the spatial location of the finger;

(iii) Playing back a certain length of sound starting from the significant place (such as a beginning of a word) which is the nearest to the segment which corresponds to the finger location; or (iv) In both (ii) and (iii), when playing back the sound, the sound volume fades with time or is filtered in some form.

Figure 6:
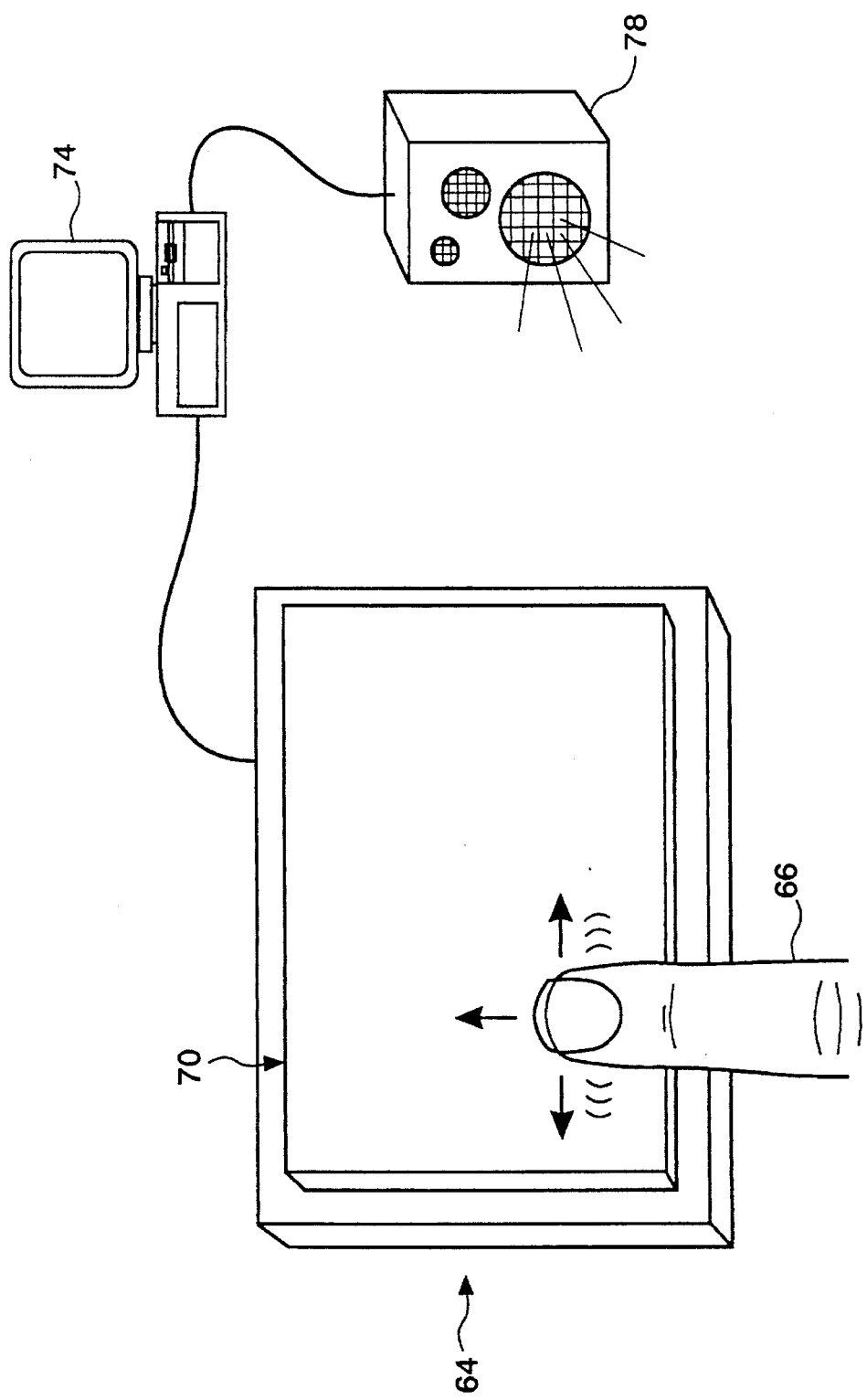
FIG. 6 is a pictorial representation of one embodiment of the system of the present invention which emphasizes a two-dimensional touch sensitive user interface device.

FIG. 6 presents a pictorial diagram which represents the operation of the system of FIG. 5. Audio information 60 is stored in computer 74. Computer 74, in turn, assigns a sequence of timing marks which denote the passage of time in the audio information 60. The segments of audio information between each successive pair of timing marks are in turn mapped to a set of two-dimensional coordinates which correspond to the two-dimensional coordinates of touch-sensitive pads 70 of two-dimensional interface device 64. A particular two-dimensional coordinate is accessed by finger 66 touching that coordinate. This finger position, in the form of an input spatial coordinate, is fed to computer 74, which accesses the corresponding segment of audio information and plays back that information to speaker 78, which generates an acoustic output. Further, computer 74 sends the accessed segment of audio information to interface device 64, which vibrates in proportion to the accessed audio segment in a manner which is felt by finger 66. In this application, the finger provides a source of kinesthetic and tactile memory which allows the user to create a sense of the whole in the information.

The operation of the system of FIGS. 5 and 6 is perhaps best described in terms of the following hypothetical application. A short presentation is given by a noted scholar on the subject of Dr. Martin Luther King. A tape of the lecture is obtained by a student and later, the student wishes to access the information contained in the lecture for a report which she is preparing.

The taped information is sampled and stored in the computer memory. During sampling, a series of timing marks are stored in conjunction with the sampled audio information which mark the spaces between spoken words of the lecture. The words of the lecture are mapped into a two-dimensional page format based upon the timing marks. The first word is mapped into a coordinate corresponding to the upper right-hand corner of a touch sensitive pad of a user interface device. Subsequent words follow in order until the first row of the touch sensitive pad is mapped, from right to left. The next row is similarly mapped with the next set of words. Each of the subsequent rows are similarly mapped until each of the words in the presentation are mapped.

The student can then begin to access the information by touching the touch sensitive pad. If the pad is touched at a single point, the word corresponding to that location is played by a speaker and the pad is vibrated by the same audio signal in such a fashion that the student can feel the vibration with her finger.

The entire presentation is played back sequentially by the student by starting her finger in the upper right hand corner and moving her finger along the first row from right to left, then the second row and then each subsequent row. The speed in which she moves her finger across a row governs the speed in which the words are played back. She browses the presentation at a relatively high speed to obtain an overview of the material.

The student then wishes to review the portion of the presentation which dealt with Dr. Martin Luther King's "I have a dream" speech. She remembers the spatial location of this portion of the speech with her kinesthetic and touching memory, that is, she remembers this portion of the speech based upon the position that her finger was in and the feel of the vibration of the professor's spoken words in this area. She easily "homes-in" on this area and accesses this portion of the presentation more slowly, with a slow scanning of this portion of the touch sensitive pad with her finger.

Figures 7, 9:
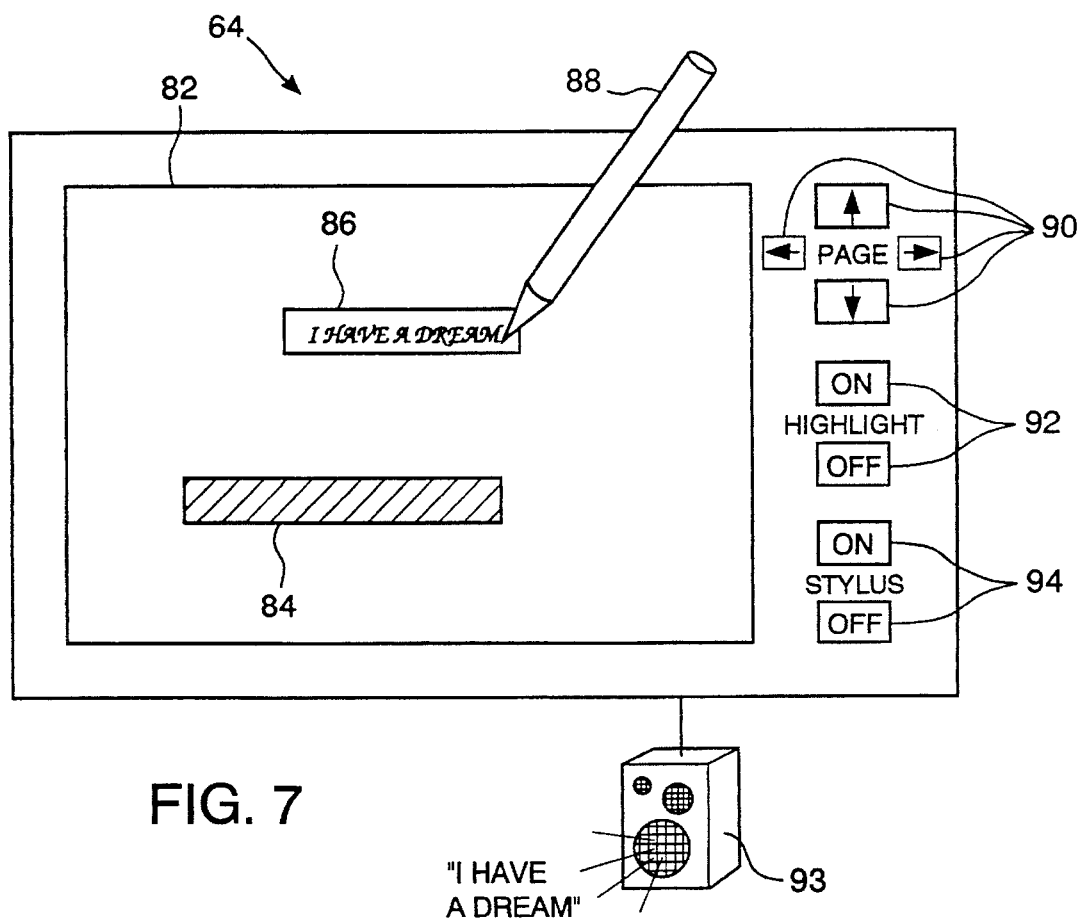
FIG. 7 is a pictorial representation of an alternative two-dimensional user interface device for use with one embodiment of the system of the present invention.
FIG. 9 presents a spatial multiple page structure used with one embodiment of the present invention.

An alternate embodiment of the two-dimensional interface device 64 is presented in FIG. 7. A two-dimensional touch sensitive pad 82 is similarly provided such that audio information can be accessed by the touch of a finger. However, provisions are made for visually highlighting and annotating portions of the information. Further, ways of accessing more than a single "page" of audio-based information is further provided.

Very large portions of audio information provide a problem with respect to the present invention. A two-hour speech, for instance, might be broken up into several thousand segments. These segments would be difficult to access if all mapped onto the coordinates of a hand-held or even desk-top touch sensitive pad. This problem can be solved, however, by only presenting a subset or "page" of the audio information for accessing at one particular time period. The pages themselves could be spatially arranged as shown in FIG. 9. If one were currently accessing page x, the user could switch to page y by pushing the right arrow amongst the arrow keys 90. Similarly, if one were accessing page x, page z, page v, or page w, could be accessed by pushing the down arrow, left arrow, or up arrow key 90, respectively.

Further, segments of audio information could be accessed at a hierarchial structure such that a level-one screen would access all of the audio information broken up into segments of, for instance, one minute long. Pressing the down arrow key 90 would change the resolution of the two-dimensional pad such that the one-minute segment currently being accessed would be in turn the entire pad broken up into a series of much shorter segments of audio information. Similarly, pressing the up arrow key 90 would change from a lower hierarchial level to a higher hierarchial level, such as from level-two no level-one. Any number of hierarchial levels could be used to access the audio information alternately on a microscopic or macroscopic scale.

Referring again to FIG. 7, once a segment of audio information which the user deems to be important is accessed and played back by audio playback device 93, the spatial coordinates of this portion of information can be visually highlighted by the user by pressing highlight-on key 92. The activation of this highlight-on key 92 would allow the user to change the color or make opaque one or more segments 84 by touching those segments. Once the highlight-off key 92 were pressed, the touch-sensitive pad would return to accessing segments of audio information based upon the touch of the finger, while leaving the highlighted segments highlighted.

In addition, important segments of text may be similarly annotated as shown in annotated block 86. Once the important segment of audio information were found, the location of this segment could be recorded by activating a stylus mode with stylus-on button 94. In the stylus mode the user could use a stylus 88 to write on the touch-sensitive screen 82 to leave a note as to the content of the audio information in that region. The user could then return to the normal audio information access mode by pressing the stylus-off key 94.

Figure 8A:
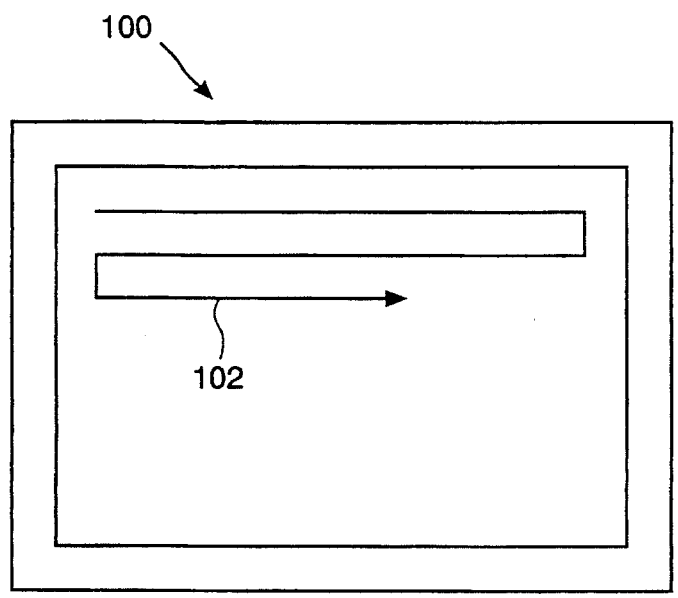
FIGS. 8a–c present scanning patterns to be used with alternative two-dimensional user-interface devices for use with one embodiment of the system of the present invention.

In many applications the mapping of a sequence of timing mark into a plurality of two-dimensional spatial coordinates would be performed in such a manner such that sequential timing marks appear in substantially adjacent coordinates. Turning now to FIG. 8a, segments of audio information could be mapped in an order corresponding to arrow 102. The first segment would appear in the upper left corner, and successive segments would follow the zig-zagged pattern of arrow 102 such that a finger scanned from left to right and then right to left one below, etc., would sequentially scan the segments of audio information. This way, the fingers don't have to "sweep" back to the left once they reach the end of a line.

Figure 8B:
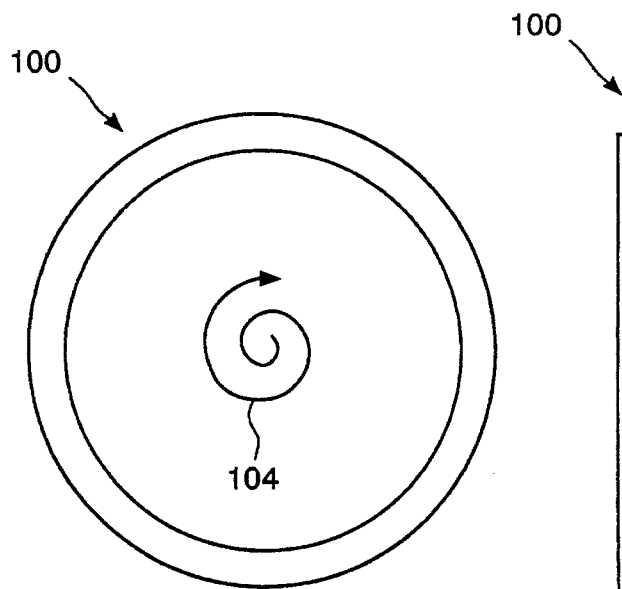
Figure 8C:
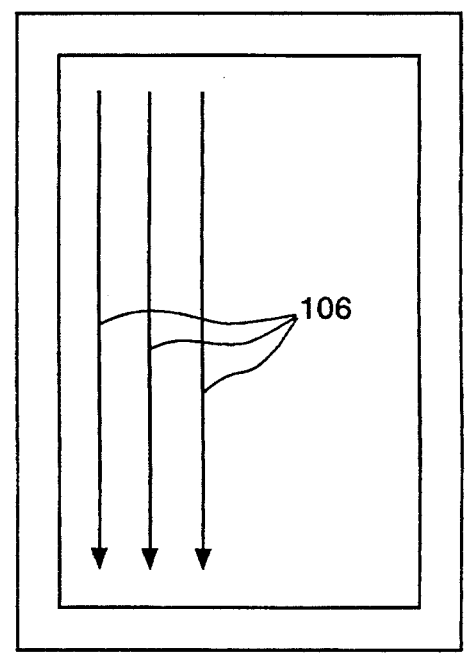

Similarly, a spiral pattern such as 104 shown on interface device 100 of FIG. 8b could be used, or vertical pattern 106 shown on interface device 100 in FIG. 8c. One with ordinary skill in the art would realize that virtually any shape could be used for a touch-sensitive pad. Further, the shape need not be flat. An interface device which allows the user to identify a coordinate on any arbitrary surface could be used. For instance, the surface of a sphere could be used in a two-dimensional interface device. Furthermore, the surface of an ordinary daily-use object, such as a cup, chair, or a door handle, could be used as an interface device.

Other applications of the present invention include using the spatially distributed audio track of a video to browse the video. Beyond this, it is possible to combine the accessing of spatialized audio with speech-to-text translation—where it is difficult to translate the speech to text, use spatialized audio. Overall, the present invention has potential applications in many broad fields including multimedia computer software, communications, sensory access equipment for the handicapped, music, visual arts, entertainment, and education.

While discussed in terms of a human user with a human memory, the present invention should be broadly considered to cover non-human users such as robots or animals capable of kinesthetic or touching memory of some form.

While the best mode for carrying out the invention has been described in detail, those familiar with the art to which this invention relates will recognize the various alternative designs and embodiments for practicing the invention as defined by the following claims.

We claim:

1. A system for permitting a user to spatially access and playback time-based information having a plurality of segments, the system comprising:

a timing-to-spatial converter which maps each of the plurality of segments to a corresponding one of a plurality of mapped spatial coordinates;

a user interface which defines an input coordinate space, the user interface operative to determine an input spatial coordinate corresponding to location of a portion of a user's body within the input coordinate space;

a spatial access device which accesses at least one segment of the time-based information corresponding to the input spatial coordinate;

a playback device which plays back the at least one segment of the time-based information in its original form; and means for producing a sensory output based on the at least one segment for sensing by the portion of the user's body, wherein the sensory output aids the user in obtaining a sense of the whole of the time-based information in the input coordinate space.

2. The system of claim 1 wherein the sensory output differs in form from the original form of the segment of the time-based information.

3. The system of claim 1 wherein the sensory output emulates the original form of the at least one segment of the time-based information.

4. The system of claim 1 wherein the sensory output is in a form of a vibration.

5. The system of claim 1 wherein the user interface is a touch-sensitive pad which determines the input spatial coordinate of a portion of the user's hand in contact therewith, and wherein the sensory output is for sensing by the user's hand.

6. The system of claim 5 wherein the time-based information is audio information, and wherein the sensory output is in a form of a vibration which emulates the at least one segment of the audio information.

7. A method of permitting a user to spatially access and playback time-based information having a plurality of segments, the method comprising:

(a) mapping each of the plurality of segments to a corresponding one of a plurality of mapped spatial coordinates;

(b) providing a user interface which defines an input coordinate space;

(c) determining an input spatial coordinate corresponding to position of a portion of a user's body within the input coordinate space using the user interface;

(d) accessing at least one of the plurality of segments of the time-based information corresponding to the input spatial coordinate;

(e) playing back the at least one segment of the time-based information in its original form; and (f) producing a sensory output based on the at least one segment for sensing by the portion of the user's body, wherein the sensory output aids the user in obtaining a sense of the whole of the time-based information in the input coordinate space.

8. The method of claim 7 wherein steps (c), (d), (e), and (f) are repeated as the portion of the user's body moves within the input coordinate space.

9. The method of claim 7 wherein the sensory output differs in form from the original form of the segment of the time-based information.

10. The method of claim 7 wherein the sensory output is in a form of a vibration.

11. The method of claim 7 wherein the user interface is a touch-sensitive pad which determines the input spatial coordinate of a portion of the user's hand in contact therewith, and wherein the sensory output is for sensing by the user's hand.

12. The method of claim 11 wherein the time-based information is audio information, and wherein the sensory output is in a form of a vibration which emulates the segment of the audio information.

13. A method of permitting a user to spatially access and playback time-based information having a plurality of segments, the method comprising:

(a) mapping each of the plurality of segments to a corresponding one of a plurality of mapped spatial coordinates;

(b) providing a user interface which defines an input coordinate space;

(c) determining an input spatial coordinate of a portion of a user's body within the input coordinate space using the user interface;

(d) accessing a segment of the time-based information corresponding to the input spatial coordinate;

(e) playing back the segment of the time-based information in its original form; and (f) producing a sensory output which corresponds to the segment for sensing by the portion of the user's body, wherein the sensory output aids the user in obtaining a sense of the whole of the time-based information in the input coordinate space, and wherein the sensory output is in a form of a temperature.

14. A system for permitting a user to spatially access and playback time-based information having a plurality of segments, the system comprising:

a timing-to-spatial converter which maps each of the plurality of segments to a corresponding one of a plurality of mapped spatial coordinates;

a user interface which defines an input coordinate space, the user interface operative to determine an input spatial coordinate of a portion of a user's body within the input coordinate space;

a spatial access device which accesses a segment of the time-based information corresponding to the input spatial coordinate;

a playback device which plays back the segment of the time-based information in its original form; and means for producing a sensory output in a form of a temperature corresponding to the segment for sensing by the portion of the user's body, wherein the sensory output aids the user in obtaining a sense of the whole of the time-based information in the input coordinate space.

15. A system for permitting a user to spatially access and playback time-based audio information having a plurality of segments, the system comprising:

a timing-to-spatial converter which maps each of the plurality of segments to a corresponding one of a plurality of mapped spatial coordinates;

a touch-sensitive pad which defines an input coordinate space, the touch-sensitive pad operative to determine an input spatial coordinate corresponding to location of a portion of a user's hand in contact therewith;

a spatial access device which accesses at least one segment of the time-based audio information corresponding to the input spatial coordinate;

an audio playback device which plays back the at least one segment of the time-based audio information in its original form; and means for producing a sensory output corresponding to the at least one segment for sensing by the portion of the user's hand, the sensory output being in a form of a vibration which emulates the segment of the time-based audio information, wherein the sensory output aids the user in obtaining a sense of the whole of the time-based information in the input coordinate space.

* * * * *